United States Patent Office 3,449,053
Patented June 10, 1969

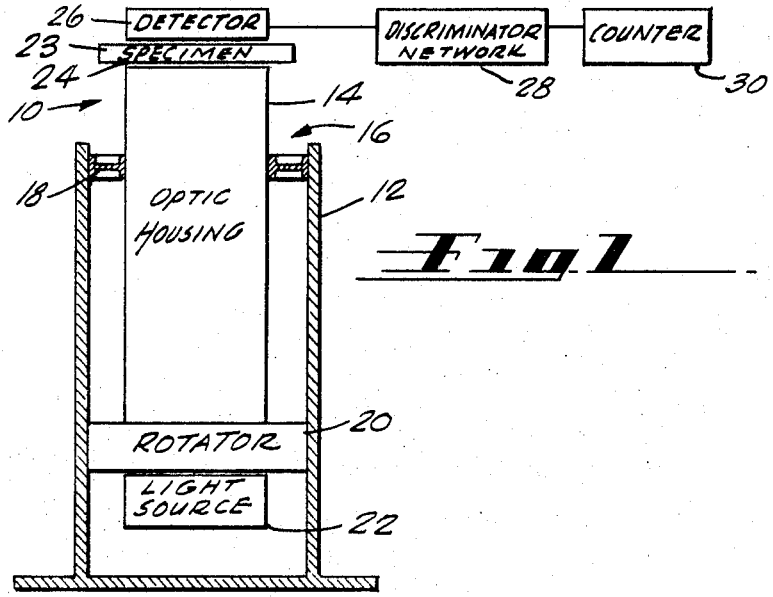
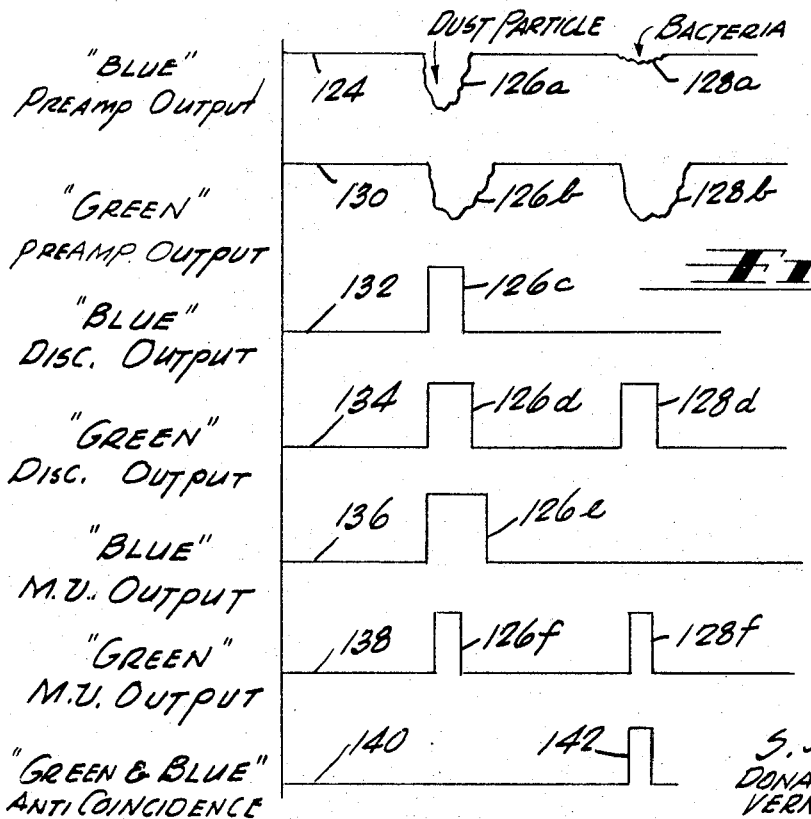

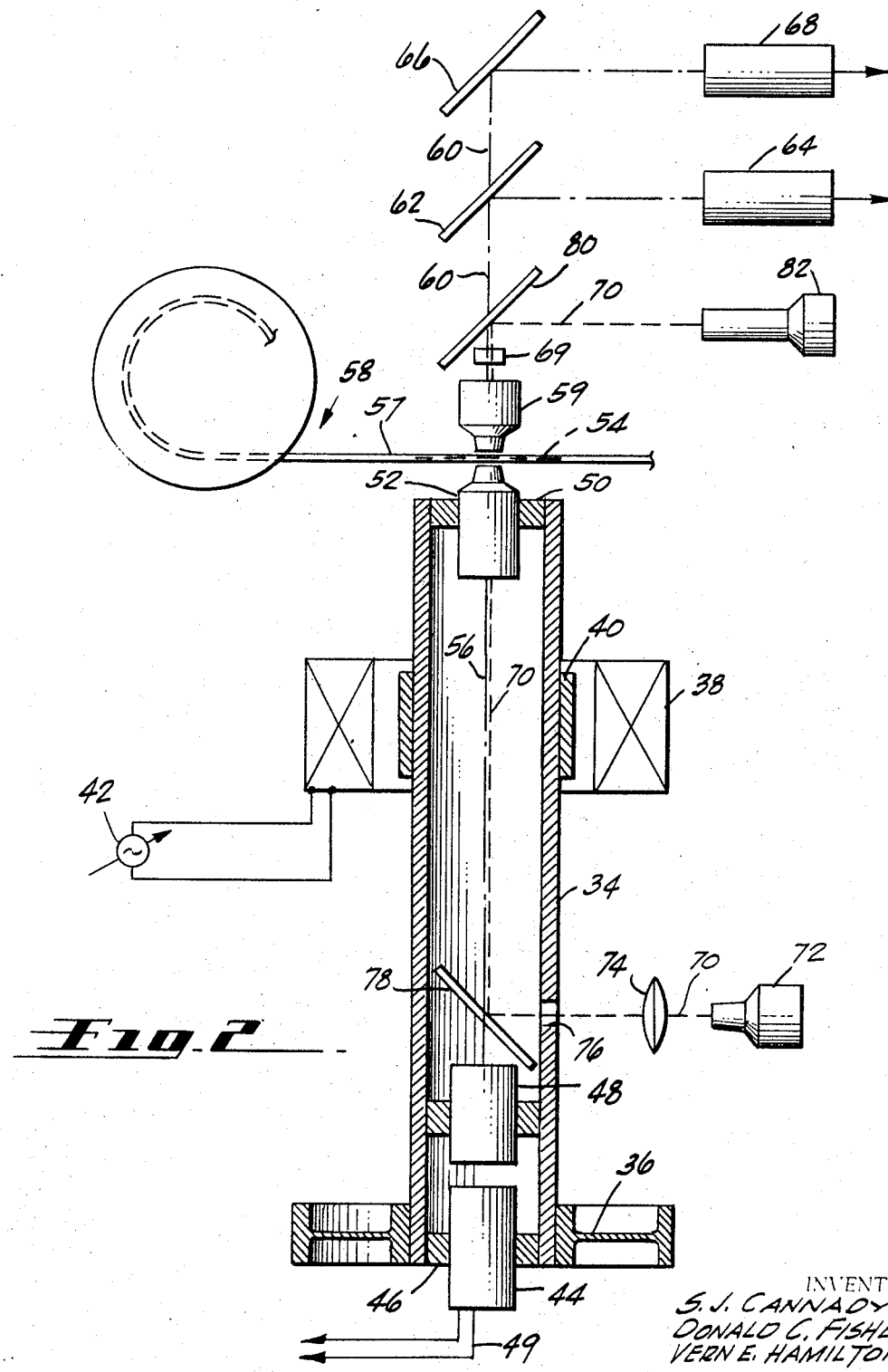

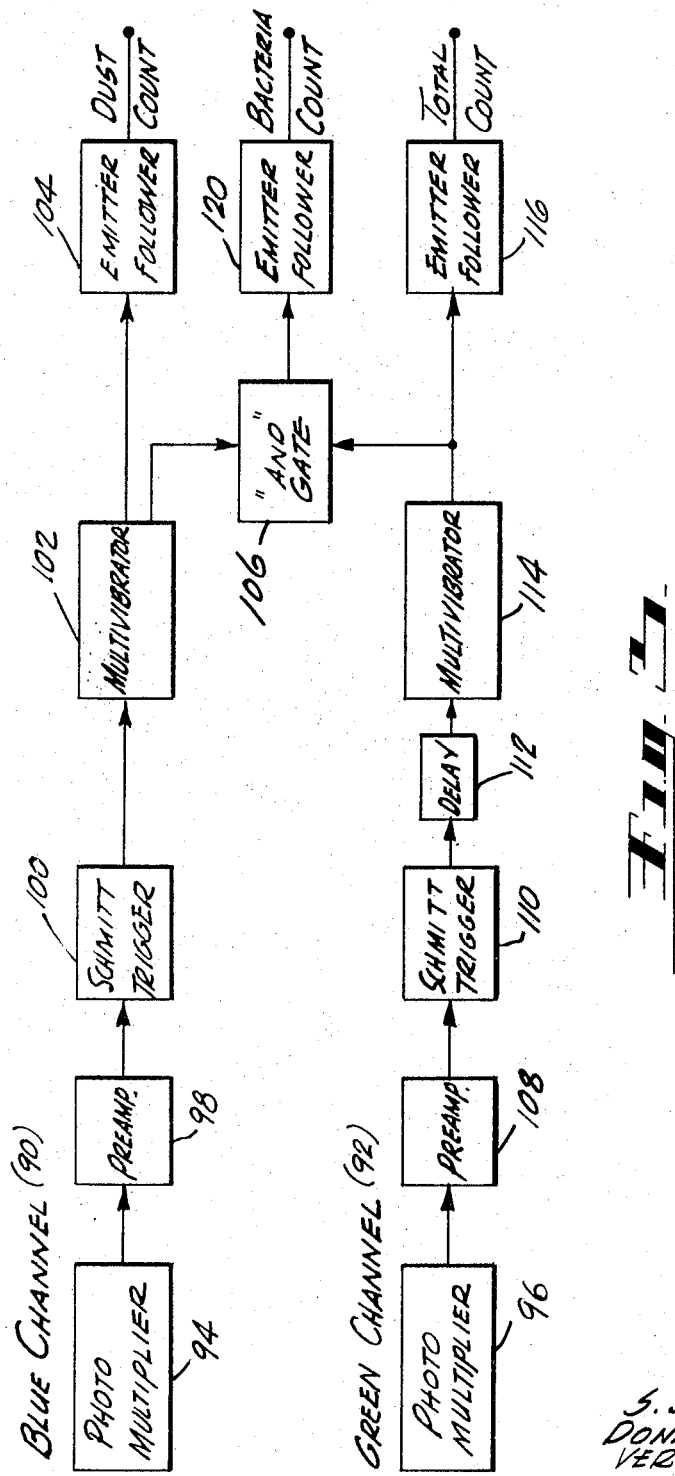

3,449,053
MICROSCOPIC EXAMINING APPARATUS UTILIZING SCANNING TECHNIQUES
Samuel J. Cannady, Pacific Palisades, Donald C. Fisher, Northridge, and Vern E. Hamilton, Palos Verdes Estates, Calif., assignors, by mesne assignments, to McDonnell Douglas Corporation, Santa Monica, Calif., a corporation of Maryland
Filed Apr. 29, 1965, Ser. No. 451,837
Int. Cl. G01j 3/46; G01w 21/06; G01n 21/22
U.S. Cl. 356—178                                    12 Claims

ABSTRACT OF THE DISCLOSURE

A structure for investigating microscopic particles is disclosed, in which a light beam is moved to scan a specimen by nutationally moving the structure that houses the beam forming and focusing elements. The light passing through the specimen is sensed by a pair of photodetectors to provide electrical signals that are processed logically to selectively indicate a bacteria count: Direct viewing structure is also incorporate in the optical system.

---

This invention relates generally to apparatus and methods for microscopically examining materials, their surfaces, and particulate matter and more particularly, but not exclusively, to high resolution equipment and techniques for observing and analyzing, in various aspects, microorganisms and other particulate substance having micron and sub-micron dimensions of interest.

A fast growing need has arisen in recent years for compact equipment capable of counting and otherwise analyzing sub-micron bacteria; and although the present invention was developed, at least in part, for answering this need, and although much of the following discussion and structural examples, for clarity and brevity, relate to the illumination of bacteria with visible electromagnetic radiation and to subsequent electronic analysis of the transmitted energy, it is expressly emphasized that the invention finds equally advantageous application in many other fields where high resolution examination of other forms of matter by other forms of radiation is desired.

A typical procedure for examining substance of this general character is to prepare, as from a suspect "cloud" or liquid, a sample of the substance, such as an aerosol impacted upon a transparent plate. The plate or slide is then illuminated with white light; and reflected or transmitted, or both, light from the microorganisms is analyzed as for distinguishing them from particles not of interest and, for example, for counting or sizing of them.

It has also been a typical practice in accordance with the best of prior art techniques to illuminate the sample with an extremely well focused beam of light having a diameter of the same order as the cross dimension of the smallest particle to be examined. This, in effect, maximizes the signal to noise ratio of the scanner by maximizing the contrast between the interrogating spot when unobstructed versus the interrogating spot when it is obstructed by a particle of interest. Providing well focussed interrogating spots of micron and sub-micron diameter with prior technology is reasonably readily accomplished by using static on-axis optics, so that the static observation of like sized bacteria has not been precluded on this basis.

However, such static observation is not generally useful because the observer is generally interested in the statistical analysis of the sample; and knowledge of a single particle, even if greatly detailed, is not of interest in forming properly generalized and therefore useful conclusions about the sample. The focussed spot is therefore typically caused to scan the sample with a raster, circular, or other appropriate scan pattern.

One of the most widely used scanning techniques in the past has been to cause the light beam, that is, the interrogating spot, to sweep a linear or circular pattern by mechanically wobbling the axis of one of the optical elements in the path of the beam. Unfortunately, the result, even with the best obtainable optics, is a defocussing of the spot to a diameter which is typically of the order of approximately 10 microns due to the consequent off-axis transmission of the beam through at least some of the elements. This defocussing effect is caused, of course, by chromatic aberration, lateral and longitudinal, of the off-axis optics.

In the past, in many applications for such studies for example the analysis of inorganic dust clouds and industrial or laboratory environments and the like, the resulting resolution provided useful and adequate results. However, as indicated above, an acute need has arisen for a compact system having much higher resolution.

Attempts, other than the above, to provide an improved resolution have typically been directed toward the utilization of a cathode ray beam which is electrically scanned and which impinges upon a phosphor plate to provide a scanning source of light at the plane of the sample. This approach has electrical and mechanical advantages, but available colors of phosphors severely limit the chromatic analysis of particles. Furthermore, the phosphors are subject to burning and deterioration with age and use; and one must optimize, or compromise, between desired light intensity and the useful lifetime of the phosphors. An additional problem with the cathode ray techniques is that due to finite persistency of the phosphors, the flying spot is comet shaped instead of round thereby diminishing the resolution of the system. Also, if the moving spot on the cathode ray tube is projected to the field of interest by optical elements not moving with the spot, off-axis conditions exist, therefore all problems noted previously again occur.

Still another prior approach has been to utilize a projected image scanner in which the field to be scanned at the plane of the sample being investigated is projected and the image is scanned as with a vidicon or orthocon camera system. However, the high resolution scanning problem remains acute and a projected image system still suffers all the inherent aberration problems of the other prior art approaches discussed above.

Accordingly, it is an object of the present invention to provide a particulate examination system and method which are not subject to these and other disadvantages of the prior art.

It is another object of the present invention to provide such apparatus which may distinguish and observe particles of the order of $\frac{1}{10}$ micron diameter.

It is another object to provide such apparatus which is economical to manufacture, compact, readily portable, highly reliable, and maintenance free.

It is another object to provide optical scanning apparatus which does not involve any off-axis transmission of the light beam therethrough up to and through the particular field of interest and which readily achieves a wide range of scanning patterns by simple electrical adjustment.

It is another object of the invention to provide such apparatus with which accurate particle counting and analysis may be accomplished substantially continuously with simple techniques by non-skilled operators.

It is another object to provide such apparatus with which the operator may observe or monitor the overall nature of the particulate sample and the scan pattern simultaneously during automatic operation of the system.

It is another object to provide such apparatus by which particles or certain of their distributions are not only counted but their size and others of their physical characteristics may be examined on a dynamic, statistically accurate basis.

Briefly, these and other objects and advantages are achieved in accordance with one example of the structural aspects of the invention in which the optical elements of the light beam apparatus, including a point light source, are mounted rigidly within a tubular housing. The light source which may be a tungsten lamp with a small hole electrode, is mounted near one end of the housing and an objective ocular is mounted at the other with minifying and other lens components mounted therebetween. Each of these elements are accurately mounted along the single, system axis thereby grossly minimizing lateral and longitudinal aberrations otherwise incumbent with the transmission of white light through refracting elements.

The resultant focussed beam has a diameter of a few tenths of a micron and is directed upon a prepared sample in the focal plane at the objective lens end of the tubular housing.

The housing assembly is suspended by a flexible metallic diaphragm, in this example, affixed transveresly between the tubular housing and a stationary frame in a manner whereby a housing has a nutational freedom of movement about its connection with the diaphragm. At a different longitudinal position along the tubular housing a ring of magnetic material is mounted about the perimeter of the housing; and a means for providing a rotating magnetic field thereabout is carried by the frame, spaced radially from the ring of magnetic material, at the same longitudinal location.

The rotary magnetic field is readily provided by a motor field coil system, and, when energized by line alternating current, the tubular housing body is driven in a nutational form of motion about the flexible diaphragm causing the optical system axis similarly to nutate while at the same time keeping all optical elements and the transmission of the light beam accurately on-axis. This causes the interrogating spot at the sample to describe a circular scan, the frequency and diameter of which are determined respectively by the angular velocity of the rotary magnetic field and amplitude of its energizing voltage. Additionally the shape of scanning pattern may be controlled from circular to linear by phasing control elements interposed between the windings of the poles of the field coil system.

The light transmitted through the sample may then be focussed upon one or a plurality of photocells for purposes of analyzing the light with respect either to its chromatic content or its amplitude as a function of time or both.

Further details of these and other features, such as for example, alternative forms of the electronic components of the invention, and their principles of operation as well as additional objects and advantages of the invention will become apparent and be best understood from a consideration of the following description taken in connection with the accompinying drawings which are all presented by way of illustrative example only and in which:

FIG. 1 is an overall block diagram of a particulate microscopic examining system constructed in accordance with the principles of the present invention;

FIG. 2 is a sectional, partially schematic view of an example of an optical scanning system constructed in accordance with the principles of the present invention;

FIG. 3 is a block diagram of a portion of an example of an electronic analyzing network embodied in some forms of the present invention; and FIG. 4 is a group of seven signal amplitude versus time graphs useful in explaining the operation of the structure illustrated in the previous figures.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard no attempt is made to show the details of the apparatus in more detail than is necessary for a fundamental understanding of the invention, the description taken with the drawings making apparent to those skilled in the arts of optics and electronics how the several forms of the invention may be embodied in practice. Specifically the details shown are not to be taken as a limitation on the scope of the invention which is defined by the appended claims forming, along with the drawings, a part of this specification.

In FIG. 1, the example of the particulate substance examining system 10 shown includes a stationary supporting frame 12 which though stable is compact and readily portable. Mounted within the stationary frame 12 is a tubular optics housing body which is mechanically supported by the frame 12 by a flexure mount which comprises, in this example, a metallic annular diaphragm member 18. The supporting diaphragm member of the flexure mount permits a nutational freedom of movement of the tubular optics housing body 14 about the diaphragm member with respect to the stationary frame 12.

Also carried by the frame is a rotator assembly 20 which in this example includes an electric motor field coil system circumdisposed concentrically about and spaced radially from the periphery of the tubular optics housing body 14 which, at least in the region of the rotator assembly, includes some magnetic material so that when a rotating magnetic field is generated by the rotator assembly 20 there is a corresponding nutationally rotating force coupled to the tubular optics housing body causing it to describe a nutational movement with respect to the stationary frame.

At the lower end, as viewed in the drawing, of the optics housing body 14 is disposed a light source 22 carried by the tubular body 14. A specimen 23 to be examined is shown disposed contiguously to the opposite, light output, end 24 of the tubular body 14 and is generally, in accordance with a preferred mode of operation of this example of this invention, maintained at rest with respect to the frame 12. By this means, then, a light beam emanating from the output end 24 of the optics in the body 14 describes a circular scanning pattern in the plane of the specimen due to the magnetic nutational driving motion of the end 24 of the tubular body due to the forces exerted thereon by the rotator assembly 20. Furthermore, as will be discussed in more detail below, the shape and scope of the pattern of illumination may be readily controlled by the particular magnetic forces generated by the rotator assembly 20 which forces may in part depend upon the magnitude of the energizing electrical power supply to the rotator and in part upon inter-coil phasing of the assembly 20.

The specimen 23 is generally transparent and the pattern of interrogating light from the light source 22 with which the specimen is illuminated serves as a source of light collected or received by a detector 26 which is disposed contiguously to the specimen 23 and oriented in the direction best to pick up the light emanating from or transmitted through the specimen being examined. The electrical output of the detector 26 is coupled to a discriminator network 28. If the mode of operation of the system 10 is the counting and sizing of particles in the specimen 23, the discriminator network 28 may be in the form of a pair of upper and lower threshold level Schmitt triggers which establish a predetermined pulse height window whereby a pulse within the pulse height window will trigger the lower Schmitt trigger, but the upper Schmitt trigger will emit a blanking pulse for actuating the blanking gate associated with the lower Schmitt trigger and no count will be recorded. A multi-position gain selector switch on a preamplifier portion of the discriminator network 28 may, by predetermined selection, establish the desired gain levels required for categorizing the particles being sized and counted into the desired plurality of size ranges.

Referring to FIG. 2, an example of the invention similar to a portion of the generalized structure shown in FIG. 1 is presented in a structurally schematic form with, however greater detail as to the disposition and orientation and nature of the optical elements utilized. Again, a circularly cylindrical tubular optics housing body 34 is shown supported by a flexure mount 36 to a stationary frame structure, not shown, for purposes of providing the supported body 34 with a nutational freedom of motion about the flexure mount 36 with respect to the stationary frame support. An electric motor type of field coil assembly 38 is also carried by the external stationary support structure in a magnetically force coupled relationship with permanent or paramagnetic material 40 carried by the optics housing body 34 radially within the assembly 38. A variable magnitude source of driving current 42 is electrically coupled to the field coil assembly 38. As indicated previously the alternating current energization of the field coils provides a rotating magnetic field, the amplitude of the magnetic force effect of which on the material 40 is determined by the amplitude of the driving current from the source 42.

A point source of light 44 is disposed near the bottom, as viewed in the drawing, end 46 of the optics housing body 34 and is energized by current impressed therethrough along a pair of leads 49 which may be coupled to a source of electrical power, not shown. The light output of the source 44 is directed along the axis of the cylindrical optics housing body 34 and is impressed upon a relatively high quality optical element such as a microscope eye piece reducing lens 48, the optic axis of which is coincident with the axis of the body 34. The light beam is then propagated to the upper end 50 of the housing body 34 where it is caused to pass through an objective lens 52 the optical axis of which is also coincident with that of the housing body and which minifies or focusses the interrogating light beam upon a focal plane 54. The objective lens 52 may in this example be an oil immersion aprochromatic lens combination. The intersection of the interrogating light beam 56 with the focal plane 54 is a spot of illuminating light the diameter of which, even though the light output from the source 44 is broad spectrum or white, light may in accordance with the structural advantages of the present invention readily be of the order of a few tenths of a micron thus permitting the detailed examination of a particle of comparable or even smaller size.

The particulate matter to be examined and analyzed such as for example bacteria intermixed with dust particles, may be impacted upon a length of Mylar tape 57 or other transparent material which together with other appropriate and well-known structure constitutes a tape vehicle 58 for placing the tape held specimen in the focal plane 54 of the objective lens 52. In this manner, the interrogating light beam 56 will either pass through the specimen in the plane 54, or be obstructed by it depending upon the disposition of, and character of, the individual particles in the specimen.

When the field coil assembly 38 is energized, with alternating current from the source 42, the interrogating spot at the plane 54 is caused to describe a predetermined scan pattern which typically is a circle or which may be an ellipse or a straight line depending upon the interconnection of the individual field coils within the field coil assembly 38 and the electrical interposition therebetween of reactance elements such as for example a capacitor.

Disposed on the opposite side of the focal plane 54, with respect to the optics housing body 34, is a condenser lens element 59 which is disposed and oriented in a manner also to be focussed at the focal plane 54 so that light from the source 44, which in effect emanates from the specimen at the focal plane 54, is received or collected. It may be noted that the optic axis of the lens element 59 is preferably made coincident with the average direction or orientation of the nutating axis of the cylindrical optics housing body 34.

Typically, as for example when it is desired to examine and count bacteria particles among dust particles on the specimen, it is prepared by dyeing the particulate matter with a blue stain such as ethyl violet or crystal violet. The stain is taken by the organic particles whereas the dust particles are not stained and, of course, remain opaque. The stained bacteria particles thus constitute blue filters and transmit blue light while being opaque to the remainder of the white light and specifically to the green light components thereof. The inorganic dust particles, on the other hand, are opaque to both green and blue spectral components, hence the light beam transmitted through the specimen 54 may be designated a response beam 60, the spectral content of which includes information as to whether the interrogating light beam 56 has been uninterrupted by particulate matter, interrupted by a blue bacteria particle, or interrupted by an opaque dust particle.

After the light, effectively emanating from the focal plane 54, has been received and collected by the objective lens element 52, which in this example is stationary and which views the entire field of the focal plane 54 which is interrogated by the nutationally generated scan described by the interrogating beam, the resultant response beam 60 impinges upon a dichroic mirror 62. This mirror splits the beam into its blue versus green spectral components directing one set toward a photomultiplier tube 64 and the other toward a full mirror 66 and then on to a second photomultiplier 68. It may be noted that when desired, the second photomultiplier tube 68 may be disposed directly in the path of the transmitted output of the dichroic mirror 62 thus eliminating the mirror 66 which is shown in this example merely for purposes of symmetry and to indicate that when desired, as for second order effects, the two portions of the light beam may be caused to suffer the same number of reflections. Such second order effects are not, however, generally of concern in the practice of the present invention.

An integrating lens system 69 may be interposed between the objective lens 52 and the dichroic mirror 62. This lens images the back element on the lens 52 on the photosensitive surface of the photomultiplier tubes so that the projected light spot moving about the plane 54 does not move as seen by the photomultipliers. This structure and technique decreases the noise generated at the photosensitive surfaces and accordingly increases the system signal to noise ratio.

For purposes of viewing the general nature of the specimen and for monitoring the scanning pattern of the interrogating beam 56 at the focal plane 54, a general illuminating beam of light 70 may be projected from a light source 72 through a beam forming lens 74, through an optical aperture 76 in the cylindrical side wall of the optics housing body 34 and upon the front surface of a half-mirror 78. The mirror 78 directs at least a desired portion of the illumination beam 70 upwardly through the objective lens 52 and, in a non-focussed manner, onto the specimen at the focal plane 54. The light energy from the general illumination beam 70 is also collected by the condenser lens 59 and directed against a half-mirror 80 which while passing the response beam 60 satisfactorily, reflects a significant portion of the general illumination beam 70 into a monitoring eye piece 82. It may be noted that during a typical mode of operation of the invention, the light source 72 may be de-energized when actual optical studies of the specimen are being made with the interrogating light beam 56.

Referring to FIG. 3, an example of an electronic analyzing network is shown in block diagram form which comprises generally a pair of channels viz. a blue channel 90 and a green channel 92. Each channel includes a photomultiplier 94, 96 respectively, the optical input of which is supplied by the split response beam 60, for example, indicated in FIG. 2. The electrical output of the photomultiplier 94 in the blue channel 90 is impressed upon a preamplifier 98 which is in turn coupled to a Schmitt trigger circuit 100 which may be adjusted to discriminate against or to eliminate signals of non-desired magnitude. The electrical output of the Schmitt trigger 100 is impressed upon the input terminal of a one-shot multivibrator 102. The output of the multivibrator 102 is, in turn, coupled to an output circuit such as an emitter follower 104, the output signal of which may be impressed on a counter or a visual display such as an oscilloscope, not shown. As indicated, the output signal from the emitter follower 104 indicates the presence of the dust particle being illuminated by the interrogated light beam 56 in the focal plane 54 (see FIG. 2). The output of the one-shot multivibrator 102 is also impressed upon an input terminal of an "and" gate 106.

The electrical output of the photomultiplier 96 in the green channel 92 is impressed upon a preamplifier circuit 108 which is in turn coupled to a Schmitt trigger 110 similar to the Schmitt trigger 100 in the blue channel 90. The output of the Schmitt trigger 110 is impressed upon a delay network 112, the magnitude of time delay of which is approximately equal to ¼ of the typical length of pulse due to the interception of the interrogating beam in the optical system by a sub-micron particle. The purpose of the delay network 112 is to provide additional accuracy and will be described in more detail below. The delayed green channel signal is then impressed on the input terminal of a one-shot multivibrator 114. The output pulses of the multivibrator 114, as will be seen below, and for purposes discussed therein, is caused to be considerably shorter than the output of the multivibrator 102. Typically, for example, the output of the multivibrator 114 is approximately ¼ the length of that outputed by the multivibrator 102.

The output of the multivibrator 114 is coupled to an emitter follower 116, the output of which indicates the interception of either bacteria or dust particles by the interrogating beam, and upon the other input terminal of the "and" gate 106. The "and" gate 106 is, in this example, an anti-coincidence network which provides an output when there is a coincidence between a pulse outputed by the multivibrator 114 and the absence at the same time, of any signal output from the multivibrator 102. The output of the "and" gate 106 thereby indicates that the blue channel 90 has not been activated but that the green channel 92 has been. This anticoincidence, as will be discussed below, causes an output of the emitter follower 120 which indicates the presence of a bacteria intercepting the interrogating light beam in the optical system of FIG. 2.

Referring to FIG. 4, each of the seven graphs shown plots signal voltage on the ordinant verses time on their common abscissas. The graphs are presented in the manner shown for clarity in describing the functions of the electronic anti-logic circuitry when a dust particle, followed a short time later by a bacteria particle, interrupt sequentially the interrogating light beam in the optics illustrated and discussed in connection with FIG. 2.

The graph 124 of FIG. 4 is a plot of the output signal of the photomultiplier 94 in the blue channel 90. It should be understood, that the spectral input to the photomultiplier 94 is substantially blue light which is absorbed by a dust particle but is passed, substantially unaffected, by a dyed blue bacteria particle. The graph 124 indicates that the signal level output of the photomultiplier 94 is substantially constant until a dust particle intercepts the interrogating light spot which causes an abrupt, momentary decrease in the signal output of the photomultiplier as indicated by the pulse 126a. It may be noted that the amplitude of the pulse 126a in the negative direction, is a measure of the degree of absorption of the blue light by the dust particle, while the length of the pulse 126a is a measure of the time required for the interrogating spot to pass across the dust particle. When the interrogating spot is impressed upon a bacteria particle, as indicated by the pulse 128a, it may be seen that the light intensity of the blue spectral components of the interrogating beam are substantially unaffected causing only a minor decrease in the signal level of the electrical output of the photomultiplier 94. The threshhold level of the Schmitt trigger 100 may be set to reject, in effect, the pulse 128a, so that the input of the multivibrator 102 sees only the dust particle caused pulse 126.

The graph 130 of FIG. 4 is a plot of the electrical output of the photomultiplier 96 in the green channel 92. Here, it should be understood that the optical or spectral input to the green channel is highly attenuated or absorbed by either a dust particle or a stained blue bacteria since both absorb green light. Accordingly, the "blue" pulse 126a, here designated 126b, is substantially duplicated in the green channel. When, however, the bacteria particle is interposed in the interrogating light beam, the transmitted green light is abruptly diminished in magnitude as indicated by the pulse 128b. Both of the pulses 126b and 128b are accepted by the Schmitt trigger 110 in the green channel.

The graph 132 and the graph 134 illustrate the signal outputs of the blue Schmitt trigger discriminator 100 and the green channel Schmitt trigger discriminator 110 respectively. The pulse 126c is generated by the Schmitt trigger with an even amplitude and a pulse length approximately equal to that of the original pulse 126a. In like manner, a similar output pulse 126c and 128c is provided at the output of the green channel Schmitt trigger 110 in response to the pulses 126b, 128b respectively.

The graph 136 illustrates the output of the blue channel multivibrator 102 as being a somewhat widened pulse 126d when triggered by the pulse 126c from the Schmitt trigger 100. Similarly the graph 138 illustrates that the output pulses 126f and 128f are the output responses of the green multivibrator 114 when triggered by the pulses 126d, 128d respectively. It may also be noted that the pulses 126f and 128f are shown delayed by approximately ¼ of the pulse width of the pulse 126e and considerably narrowed in order to cause them to occur clearly within the duration of the output pulse 126e of the blue channel multivibrator thereby allowing for and eliminating coincidence problems due to leading edge jitter between blue and green pulses to insure that dust particles will not be miscounted as false bacteria counts.

The graph 140 indicates the output signal of the "and" gate 106 as indicated, when a coincidence occurs between the blue multivibrator output and the green multivibrator output e.g. pulses 126e, 126f, there is no output pulse from the gate 106. When however, the anticoincidence of an output from the green multivibrator, 128f occurs at the same time that there is a definite absence of signal from the blue multivibrator output, then the "and" gate 106 outputs a pulse 142 indicating a bacteria count. In other words, when the green channel is interrupted but the blue channel is not, the conclusion is that a particle was interrogated which passed blue light but absorbed green light which is the criteria for concluding that a bacteria particle has been observed.

There has thus been disclosed and described a number of examples of a particulate examining system which achieves the objects and exhibits the advantages set forth hereinabove.

What is claimed is:

1. Optical particulate examining system including an optical scanning illuminator comprising:
    tubular optical housing body having a mid-portion and first and second ends;
    stationary supporting frame means;
    flexible mounting means affixed supportively to said tubular optic housing body between said mid-portion and said first end thereof, said mounting means being supportively carried by said stationary frame means and being of a character to permit a nutational freedom of movement of said tubular optic housing body about said flexible mounting means with respect to said frame means;

magnetic force motive means for nutationally driving said tubular body about said flexible mounting means, said motive means being carried by said stationary frame means and coupled to said tubular housing body at a position therealong between said flexible mounting means and one of said first and second ends;

variable magnitude electric means coupled to said motive means for providing energization of a current thereto;

a relatively broad spectrum point light source means carried by said tubular housing body and disposed contiguously to said first end and being oriented to direct light energy along a predetermined axis toward said second end;

beam forming and minifying lens means carried by said tubular housing body and disposed with the optic axis of said lens means coincident with said predetermined axis for directing said light energy into a beam coincident with said predetermined axis;

first objective lens means carried by said tubular housing body and disposed contiguously to said second end with its optic axis also coincident with said predetermined axis for focussing said beam into a submicron interrogating and illuminating spot at a focal point disposed contiguously to said second end.

2. The invention according to claim 1 which further includes means for removably holding a specimen to be examined in said focal plane.

3. The invention according to claim 2 which further includes a second objective lens means carried by said stationary frame means disposed with its optic axis substantially coincident with the average direction of said predetermined axis and disposed on the side of said focal plane opposite from said first objective lens means, for forming into a response beam, the light from said first objective lens which is transmitted through said specimen in said focal plane; beam splitting dichroic mirror means carried by said frame means and interposed in said response beam for directing predetermined spectral portions of the light energy thereon along the first path and for directing other spectral portions of the light energy of said response beam along a second path.

4. The invention according to claim 3 which further includes first photo-multiplier detector means disposed along said first path for intercepting said predetermined spectral portions and providing a first electrical signal representative thereof; and second photo-multiplier detector means disposed along said second path for intercepting said other spectral portions and providing a second electrical signal representative thereof.

5. The invention according to claim 4 which further includes:
first and second amplifier means coupled respectively to said first and second detector means;
first and second Schmitt trigger means coupled respectively to said first and second amplifier means;
first and second multi-vibrator means coupled respectively to said first and second trigger means;
signal delay means interposed between said second trigger means and said second multi-vibrator means; and
coincident gate means having first and second inputs coupled respectively to said first and second multi-vibrator means.

6. Apparatus for microscopic examination comprising: external stationary frame means;

an optic support body having first and second ends;
a source of electromagnetic illuminating radiation mounted at said first end of said support body and being oriented to direct said radiation along a predetermined fixed axis with respect to said support body;
means for focussing said radiation into a beam along said axis and for projecting said beam onto a focal plane disposed contiguously to said second end of said support body;
means for removably supporting a specimen containing particulate matter, in said focal plane;
flexible mounting means connecting said optic support body to said stationary frame means for flexibility supporting said body with reference to said frame;
motive means coupled to said optic support body for driving said support body with respect to said stationary frame means whereby the intersection between said beam and said focal point describes predetermined scanning pattern thereon; and
means for sensing radiation from said source at a location beyond said means for removably supporting a specimen, for manifesting said radiation.

7. The invention according to claim 6 in which said source of radiation is a point source of visible, broad spectrum light.

8. The invention according to claim 6 in which said means for focussing includes beam minifying and objective lens elements each mounted on said object support body with their optic axes coincident with said predetermined axis.

9. The invention according to claim 6 in which said flexible mounting means comprises a flexible diaphragm connected to said optic support body and disposed substantially transversely to said predetermined axis thereof.

10. The invention according to claim 6 in which said motive means comprises electric coil apparatus circumdisposed about said optic support body and being of the character to generate a rotating magnetic field when energized by alternating current and further comprising magnetic material carried by said support body in magnetic force interchange relationship with said rotating magnetic field.

11. An apparatus according to claim 6 wherein said means for sensing radiation comprises at least one photodetector means for providing an electrical signal to manifest said radiation.

12. An apparatus according to claim 11 wherein said photodetector means comprises a plurality of photodetectors for producing a plurality of independent signals and further comprising signal processing means for logically combining said independent signals to provide an output representative of microscopic particles.

References Cited

UNITED STATES PATENTS

| | | |
|---|---|---|
| 2,076,553 | 4/1937 | Drinker et al. |
| 2,661,902 | 12/1953 | Wolff et al. |
| 2,769,365 | 11/1956 | Loeschcke et al. |
| 2,903,597 | 9/1959 | Dell et al. |
| 2,969,708 | 1/1961 | Polanyi et al. |
| 3,127,505 | 3/1964 | Gustavson. |
| 3,279,305 | 10/1966 | Muta et al. |
| 3,299,256 | 1/1967 | Howe et al. |

RONALD L. WIBERT, *Primary Examiner.*

WARREN A. SKLAR, *Assistant Examiner.*

U.S. Cl. X.R.

356—203, 204, 206; 250—222, 234